(12) United States Patent
Jin

(10) Patent No.: US 10,841,697 B1
(45) Date of Patent: Nov. 17, 2020

(54) METHOD AND APPARATUS FOR PLAYING AUDIO, PLAYING DEVICE, AND STORAGE MEDIUM

(71) Applicant: Beijing Xiaomi Mobile Software Co., Ltd., Beijing (CN)

(72) Inventor: Tao Jin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/699,359

(22) Filed: Nov. 29, 2019

(30) Foreign Application Priority Data

May 16, 2019 (CN) .......................... 2019 1 0406124

(51) Int. Cl.
| | |
|---|---|
| *G10L 21/0232* | (2013.01) |
| *H04R 3/04* | (2006.01) |
| *G10L 25/51* | (2013.01) |
| *G10L 25/18* | (2013.01) |

(52) U.S. Cl.
CPC ................ *H04R 3/04* (2013.01); *G10L 25/18* (2013.01); *G10L 25/51* (2013.01)

(58) Field of Classification Search
CPC . G06F 1/06; G06F 1/10; H03L 7/0814; H03L 7/0992; H03L 7/091; H04S 3/008
USPC ..................................... 381/58–59, 94.1–94.3
See application file for complete search history.

(56) References Cited

U.S. PATENT DOCUMENTS

| | | | |
|---|---|---|---|
| 2002/0040403 A1 | 4/2002 | Goldhor et al. | |
| 2010/0286989 A1* | 11/2010 | Urata | G11B 20/00007 704/500 |
| 2017/0270947 A1 | 9/2017 | Zhan | |

FOREIGN PATENT DOCUMENTS

EP 3 118 855 A1 1/2017

* cited by examiner

*Primary Examiner* — George C Monikang
(74) *Attorney, Agent, or Firm* — Oblon, McClelland, Maier & Neustadt, L.L.P.

(57) ABSTRACT

The present disclosure relates to a method for playing audio, an apparatus for playing audio, a playing device, and storage medium, and belongs to the field of electronic technology. The method includes detecting an amount of audio sampling points in a buffer area that is configured to store the audio sampling points received from an electronic device based on a first sampling frequency, wherein the audio sampling points are obtained by decoding audio data from the electronic device; when a first quantity of the sampling points based on the first sampling frequency is out of a default quantity range, adjusting a preset first frequency-division parameter to obtain a second frequency-division parameter; determining a second sampling frequency based on the second frequency-division parameter; and extracting the audio sampling points from the buffer area based on the second sampling frequency for playing audio data.

20 Claims, 5 Drawing Sheets

METHOD AND APPARATUS FOR PLAYING AUDIO, PLAYING DEVICE, AND STORAGE MEDIUM

CROSS-REFERENCE TO RELATED APPLICATIONS

This application is based upon and claims priority to Chinese Patent Application No. 201910406124.2, filed on May 16, 2019, the entire contents of which are incorporated herein by reference.

TECHNICAL FIELD

The present disclosure relates to the field of electronic technologies, and more particularly, to a method for playing audio, an apparatus for playing audio, a playing device, and storage medium.

BACKGROUND

With the development of electronic technology and the increasing demand for audio playing effects from users, there are many playing devices for playing audio data, such as smart speakers, which can be connected to electronic devices to play audio data in the electronic devices, thereby improving the playing effect of audio data.

In the related art, the electronic device establishes a connection with the playing device, and the electronic device decodes the audio data to obtain an audio sampling point, and the obtained audio sampling point is sent to the playing device according to a first sampling frequency, and is stored in a buffer area by the playing device. The playing device generates an oscillation signal, and performs frequency division processing on the oscillation signal according to frequency-division parameters to obtain a clock signal, and extracts the audio sampling point from the buffer area for playing according to the second sampling frequency of the clock signal, thereby realizing the effect of playing the audio data. Only when the frequency of the oscillation signal satisfies the requirement, it may be ensured that the first sampling frequency and the second sampling frequency are equal, and the electronic device is synchronized with the playing device.

However, the playing device may be affected by temperature and cause zero drift, resulting in a change in the frequency of the oscillation signal, that is, the sampling frequency of the playing device changes, and the second sampling frequency is not equal to the first sampling frequency, and the electronic device is not synchronized with the playing device, affecting the playing effect of audio data.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for playing audio data. The method includes detecting an amount of audio sampling points in a buffer area that is configured to store the audio sampling points received from an electronic device based on a first sampling frequency, wherein the audio sampling points are obtained by decoding audio data from the electronic device; when a first quantity of the sampling points based on the first sampling frequency is out of a default quantity range, adjusting a preset first frequency-division parameter to obtain a second frequency-division parameter; determining a second sampling frequency based on the second frequency-division parameter; and extracting the audio sampling points from the buffer area based on the second sampling frequency for playing audio data.

According to an aspect, adjusting the preset first frequency-division parameter to obtain the second frequency-division parameter includes increasing the first frequency-division parameter to obtain the second frequency-division parameter when the first quantity is greater than a maximum boundary value of the default quantity range.

According to another aspect, increasing the first frequency-division parameter to obtain the second frequency-division parameter includes increasing the first frequency-division parameter by a first preset threshold to obtain the second frequency-division parameter; or increasing the first frequency-division parameter based on a first preset ratio to obtain the second frequency-division parameter.

According to yet another aspect, the first frequency-division parameter is a ratio between a preset numerator parameter and a preset denominator parameter, and increasing the first frequency-division parameter to obtain the second frequency-division parameter includes increasing the preset numerator parameter when the preset denominator parameter is kept unchanged to obtain a ratio between an increased preset numerator parameter and the preset denominator parameter as the second frequency-division parameter; or decreasing the preset denominator parameter when the preset numerator parameter is kept unchanged to obtain a ratio between the preset numerator parameter and a decreased preset denominator parameter as the second frequency-division parameter.

According to yet another aspect, adjusting the preset first frequency-division parameter to obtain the second frequency-division parameter includes decreasing the first frequency-division parameter to obtain the second frequency-division parameter when the first quantity is less than a minimum boundary value of the default quantity range.

According to yet another aspect, decreasing the first frequency-division parameter to obtain the second frequency-division parameter includes decreasing the first frequency-division parameter by a second preset threshold to obtain the second frequency-division parameter; or decreasing the first frequency-division parameter based on a second preset ratio to obtain the second frequency-division parameter.

According to yet another aspect, the first frequency-division parameter is a ratio between a preset numerator parameter and a preset denominator parameter, and decreasing the first frequency-division parameter to obtain the second frequency-division parameter includes decreasing the preset numerator parameter when the preset denominator parameter is kept unchanged to obtain a ratio between a decreased preset numerator parameter and the preset denominator parameter as the second frequency-division parameter; or increasing the preset denominator parameter when the preset numerator parameter is kept unchanged to obtain a ratio between the preset numerator parameter and an increased preset denominator parameter as the second frequency-division parameter.

According to yet another aspect, determining the second sampling frequency based on the second frequency-division parameter includes performing frequency division processing on a generated oscillation signal to obtain a clock signal based on the second frequency-division parameter; and determining a frequency of the clock signal as the second sampling frequency.

In an aspect, the method further includes continuing to detect an amount of the audio sampling points in the buffer area; restoring the second frequency-division parameter as the first frequency-division parameter when a second quantity detected is within the default quantity range; determining a third sampling frequency based on the first frequency-division parameter; and extracting the audio sampling points from the buffer area based on the third sampling frequency for playing audio.

Aspects of the disclosure also provide an apparatus for playing audio data. The apparatus includes a processor and a memory for storing instructions executable by the processor. The processor is configured to detect an amount of audio sampling points in a buffer area that is configured to store the audio sampling points received from an electronic device based on a first sampling frequency, wherein the audio sampling points are obtained by decoding audio data from the electronic device; when a first quantity of the sampling points based on the first sampling frequency is out of a default quantity range, adjust a preset first frequency-division parameter to obtain a second frequency-division parameter; determine a second sampling frequency based on the second frequency-division parameter; and extract the audio sampling points from the buffer area based on the second sampling frequency for playing audio data.

According to an aspect, the apparatus further includes a signal generator; a frequency divider; and a player, wherein the signal generator is configured to generate an oscillation signal, wherein the frequency divider is configured to perform frequency division processing on the oscillation signal to obtain a clock signal based on the second frequency-division parameter, and wherein the player is configured to determine a frequency of the clock signal as the second sampling frequency, and extract the audio sampling points from the buffer area based on the second sampling frequency for playing audio.

Aspects of the disclosure also provide a non-transitory computer-readable storage medium storing instructions that, when executed by one or more processors of a device, cause the device to detect an amount of audio sampling points in a buffer area that is configured to store the audio sampling points received from an electronic device based on a first sampling frequency, wherein the audio sampling points are obtained by decoding the audio data from the electronic device; when a first quantity of the sampling points based on the first sampling frequency is out of a default quantity range, adjust a preset first frequency-division parameter to obtain a second frequency-division parameter; determine a second sampling frequency based on the second frequency-division parameter; and extract the audio sampling points from the buffer area based on the second sampling frequency for playing the audio data.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
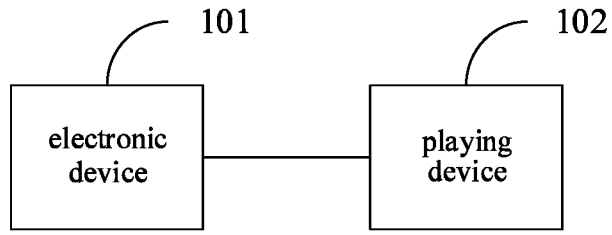
FIG. 1 is a schematic structural diagram showing an implementation environment according to an exemplary aspect of the present disclosure.

FIG. 1 is a schematic structural diagram showing an implementation environment according to an exemplary aspect. Referring to FIG. 1, the implementation environment includes an electronic device 101 and a playing device 102. The electronic device 101 and the playing device 102 are connected through a wireless network or a wired cable. For example, the electronic device 101 and the playing device 102 are connected by I2S (Inter-IC Sound, integrated circuit built-in audio bus), or the electronic device 101 and the playing device 102 are connected by SPDIF (Sony/Philips Digital Interface, which is a digital audio interface).

The electronic device is a device that stores audio data, and may be a mobile phone, a personal computer, a tablet computer, or the like. The playing device is a device for playing audio data, and can be a speaker, a television, or the like.

In the aspect of the present disclosure, the electronic device 101 decodes the audio data to obtain audio sampling points, and sends the audio sampling points obtained by sampling to the playing device 102 according to the first sampling frequency. The playing device 102 stores the received audio sampling points in the buffer area, and extracts the audio sampling points from the buffer area according to the second sampling frequency for playing audio.

If the first sampling frequency is equal to the second sampling frequency, it can ensure that the electronic device is synchronized with the playing device.

If the first sampling frequency is greater than the second sampling frequency, it may cause that the electronic device and the playing device are out of synchronization, and the rate at which the electronic device sends the audio sampling points is greater than the rate at which the playing device extracts the audio sampling points. As a result, the audio sampling points in the buffer area are more and more, which may cause that the number of audio sampling points in the buffer area reaches the maximum number of audio sampling points which can be stored in the buffer area, and then the audio sampling points subsequently sent by the electronic device are lost, resulting in inconsistent audio data playing and affecting the playing effect of the audio data.

If the first sampling frequency is smaller than the second sampling frequency, it may cause that the electronic device is out of synchronization with the playing device, and the rate at which the electronic device sends the audio sampling points is smaller than the rate at which the playing device extracts the audio sampling points. As a result, the audio sampling points in the buffer area are less and less, which may cause that no audio sampling points exist in the buffer area, and then cause playing to be stuck, affecting the playing effect of the audio data.

Figure 2:
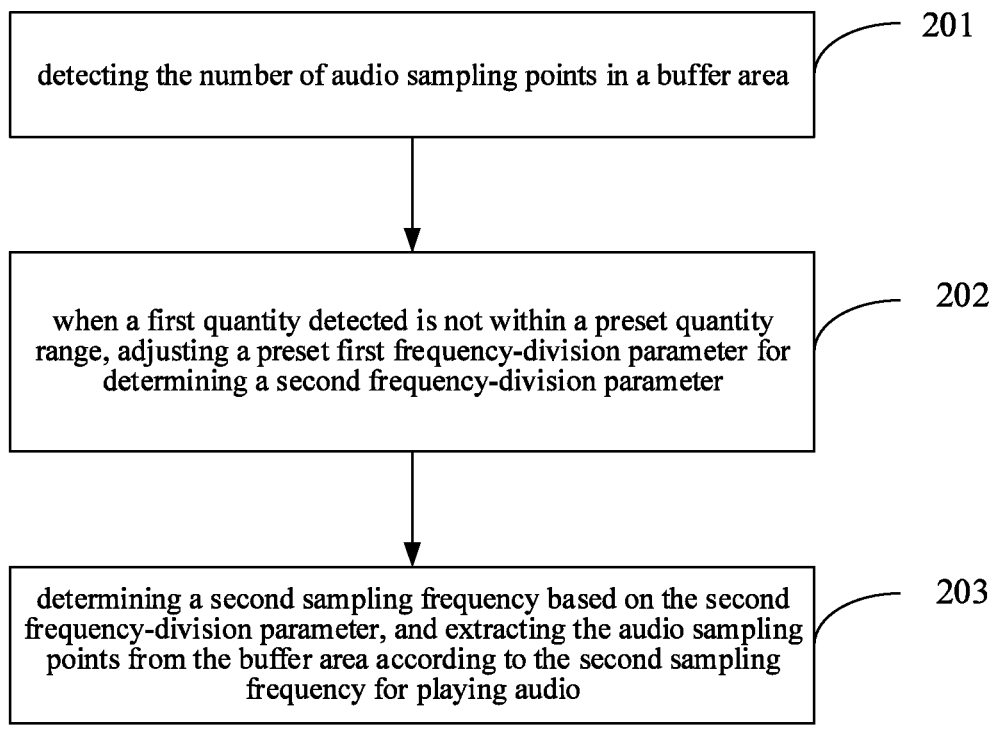
FIG. 2 is a flowchart showing a method for playing audio according to an exemplary aspect of the present disclosure.

FIG. 2 is a flowchart showing a method for playing audio according to an exemplary aspect. Referring to FIG. 2, the method includes following steps.

In step 201, the number of audio sampling points in a buffer area is detected.

The buffer area is used to store the audio sampling points sent by an electronic device according to a first sampling frequency, wherein the audio sampling points are obtained by decoding audio data by the electronic device.

In step 202, when a first quantity detected is not within a default quantity range, a preset first frequency-division parameter is adjusted to obtain a second frequency-division parameter.

In step 203, a second sampling frequency is determined based on the second frequency-division parameter, and the audio sampling points are extracted from the buffer area according to the second sampling frequency for playing audio.

In the method provided by the aspect of the present disclosure, the electronic device decodes the audio data, and sends the obtained audio sampling points to the playing device according to the first sampling frequency. The playing device stores the audio sampling points in the buffer area, and determines a sampling frequency based on the first frequency-division parameter, and extracts the audio sampling points from the buffer area according to the sampling frequency. In addition, the number of the audio sampling points in the buffer area is detected. When the first quantity detected is not within the default quantity range, the first frequency-division parameter is adjusted to obtain the second frequency-division parameter. The second sampling frequency is determined based on the second frequency-division parameter, and the audio sampling points are extracted from the buffer area according to the second sampling frequency for playing audio. It is judged whether the electronic device and the playing device are synchronized according to whether the number of audio sampling points in the buffer area is within the default quantity range. Thus, when the electronic device and the playing device are not synchronized, the frequency-division parameter is adjusted to adjust the sampling frequency of the playing device, and to decrease the difference between the sampling frequency of the playing device and the first sampling frequency of the electronic device, thereby the playing device and the electronic device tends to be synchronized, to ensure not affecting the playing effect of the audio data.

In a possible implementation, adjusting a preset first frequency-division parameter for determining a second frequency-division parameter when a first quantity detected is not within a default quantity range, includes:

when the first quantity is greater than a maximum boundary value of the default quantity range, the first frequency-division parameter is increased to obtain the second frequency-division parameter.

In another possible implementation, increasing the first frequency-division parameter to obtain the second frequency-division parameter, includes:

increasing the first frequency-division parameter by a first preset threshold to obtain the second frequency-division parameter; or increasing the first frequency-division parameter according to a first preset ratio to obtain the second frequency-division parameter.

In another possible implementation, the first frequency-division parameter is a ratio between a preset numerator parameter and a preset denominator parameter; and increasing the first frequency-division parameter to obtain the second frequency-division parameter, includes:

increasing the preset numerator parameter in a case that the preset denominator parameter is kept unchanged, to obtain a ratio between an increased preset numerator parameter and the preset denominator parameter as the second frequency-division parameter; or decreasing the preset denominator parameter in a case that the preset numerator parameter is kept unchanged, to obtain a ratio between the preset numerator parameter and a decreased preset denominator parameter as the second frequency-division parameter.

In another possible implementation, adjusting a preset first frequency-division parameter for determining a second frequency-division parameter when a first quantity detected is not within a default quantity range, includes:

when the first quantity is less than a minimum boundary value of the default quantity range, decreasing the first frequency-division parameter to obtain the second frequency-division parameter.

In another possible implementation, decreasing the first frequency-division parameter to obtain the second frequency-division parameter includes:

decreasing the first frequency-division parameter by a second preset threshold to obtain the second frequency-division parameter; or decreasing the first frequency-division parameter according to a second preset ratio to obtain the second frequency-division parameter.

In another possible implementation, the first frequency-division parameter is the ratio between the preset numerator parameter and the preset denominator parameter; and decreasing the first frequency-division parameter to obtain the second frequency-division parameter includes:

decreasing the preset numerator parameter in a case that the preset denominator parameter is kept unchanged, to obtain a ratio between a decreased preset numerator parameter and the preset denominator parameter as the second frequency-division parameter; or increasing the preset denominator parameter in a case that the preset numerator parameter is kept unchanged, to obtain a ratio between the preset numerator parameter and an increased preset denominator parameter as the second frequency-division parameter.

In another possible implementation, determining a second sampling frequency based on the second frequency-division parameter includes:

performing frequency division processing on a generated oscillation signal to obtain a clock signal based on the second frequency-division parameter, and determining a frequency of the clock signal as the second sampling frequency.

In another possible implementation, the method further includes:

continuing to detect the number of the audio sampling points in the buffer area;

restoring the second frequency-division parameter as the first frequency-division parameter, when a second quantity detected is within the default quantity range; and determining a third sampling frequency based on the first frequency-division parameter, and extracting the audio sampling points from the buffer area according to the third sampling frequency for playing audio.

Figure 3:
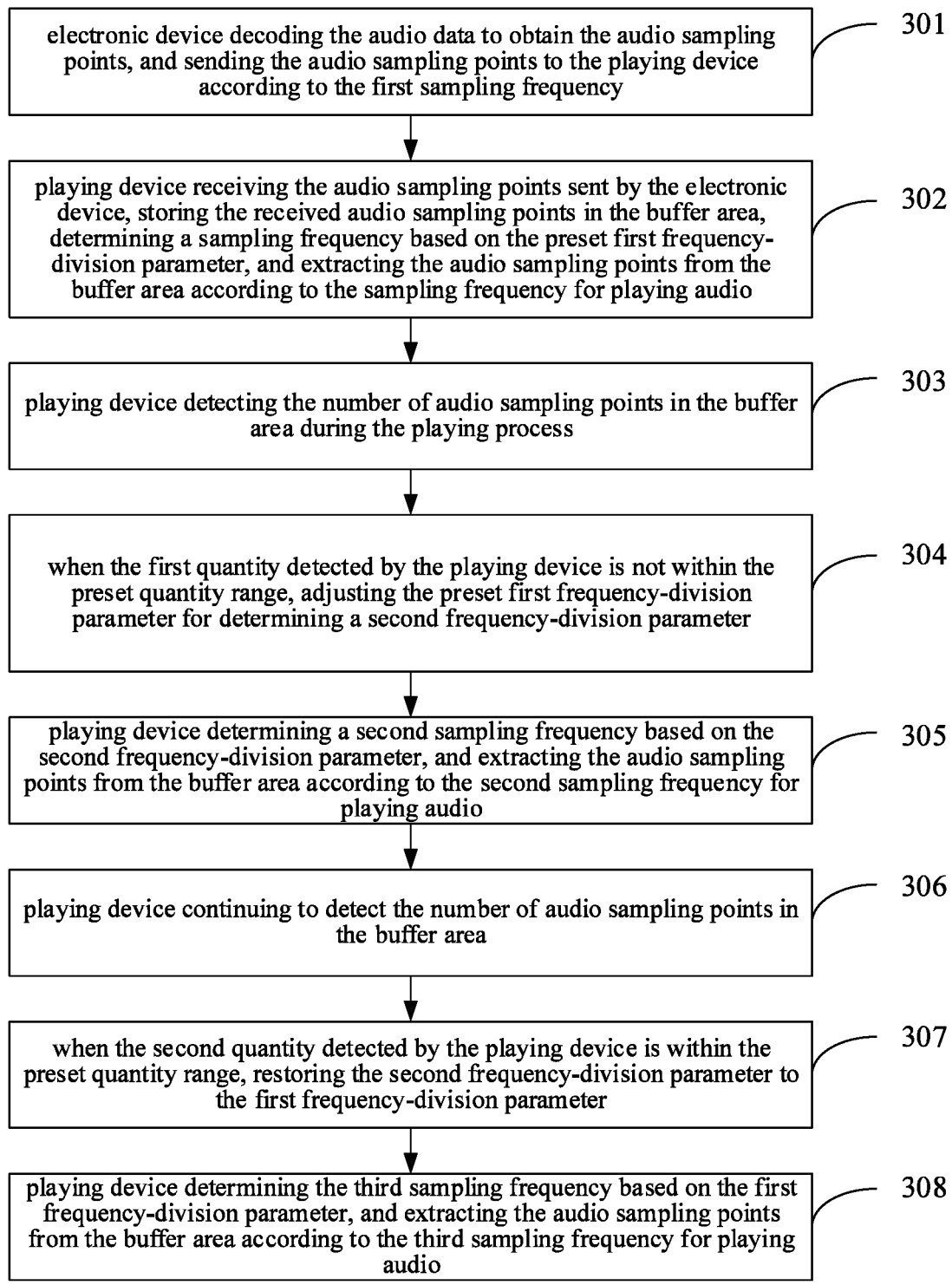
FIG. 3 is a flowchart showing a method for playing audio according to an exemplary aspect of the present disclosure.

FIG. 3 is a flowchart showing a method for playing audio according to an exemplary aspect. Referring to FIG. 3, the method includes following steps.

In step 301, the electronic device decodes the audio data to obtain the audio sampling points, and sends the audio sampling points to the playing device according to the first sampling frequency.

In the aspect, the audio data can be songs, recordings, and the like. The sampling frequency is used to indicate the frequency at which the electronic device sends the audio sampling points to the playing device, which may be represented by the number of audio sampling points sent per second or represented in other forms. The sampling frequency of the electronic device and the sampling frequency of the playing device are determined by a protocol between the electronic device and the playing device.

After acquiring the audio data, the electronic device decodes the audio data to obtain the audio sampling points of the audio data, and sends the audio sampling points obtained by decoding to the playing device according to the first sampling frequency. That is, the number of audio sampling points sent in a unit time period is determined according to the first sampling frequency, thereby determining a time interval for transmitting the adjacent two audio sampling points, and then one audio sample point is sent to the playing device every this time interval.

In the aspect, the unit time period may be 0.01 seconds, 0.1 seconds, or the like. The first sampling frequency may be a fixed sampling frequency preset by the electronic device, or may be a sampling frequency carried in the audio data provided by the electronic device. For example, the first sampling frequency can be 44100 Hz, and then the electronic device transmits 44100 audio sampling points per second.

In step 302, the playing device receives the audio sampling points sent by the electronic device, stores the received audio sampling points in the buffer area, determines a sampling frequency based on the preset first frequency-division parameter, and extracts the audio sampling points from the buffer area according to the sampling frequency for playing audio.

The buffer area is used to store the audio sampling points sent by the electronic device. Whenever the playing device receives the audio sampling points sent by the electronic device, the playing device stores them in the buffer area.

When the playing device extracts the audio sampling points from the buffer area according to the sampling frequency, the playing can be performed, realizing the effect of playing the audio data. Moreover, the playing device deletes the extracted audio sampling points from the buffer area to save storage space.

The sampling frequency is used to indicate the frequency at which the playing device extracts the audio sampling points from the buffer area, which may be represented by the number of extracted audio sampling points per second or represented in other forms.

The playing device samples the audio data according to the determined sampling frequency, that is, determines the number of audio sampling points extracted within the unit time period according to the sampling frequency, and further determines the time interval for extracting the adjacent two audio sampling points. One audio sample point is extracted from the buffer area every this time interval. In the aspect, the unit time period may be 0.01 seconds, 0.1 seconds, or the like.

In the aspect of the present disclosure, the sampling frequency of the playing device is determined according to the frequency-division parameter. To ensure synchronization between the playing device and the electronic device, the playing device presets a first frequency-division parameter, wherein the first frequency-division parameter is a frequency-division parameter determined by the playing device to generate a sampling frequency that is the same as the first sampling frequency of the electronic device. Therefore, the playing device determines the sampling frequency based on the first frequency-division parameter, thereby ensuring that the sampling frequency is the same as the first sampling frequency of the electronic device, realizing the synchronization between the playing device and the electronic device.

In a possible implementation, the process of determining a sampling frequency based on the first frequency-division parameter may include the following steps 3021-3022.

In 3021, the playing device generates an oscillation signal.

In the aspect of the present disclosure, in order to determine a fixed sampling frequency, the playing device may generate an oscillation signal with a fixed frequency, and subsequently generate a sampling frequency based on the oscillation signal.

In a possible implementation, the playing device includes a crystal resonator and a frequency multiplier circuit. The crystal resonator is connected with the frequency multiplier circuit. The crystal resonator generates a signal of a fixed frequency, and the frequency multiplier circuit amplifies the frequency of the signal to obtain the oscillation signal.

The frequency multiplier circuit includes at least one of an APLL (A Phase Locked Loop) circuit and an MPLL (M Phase Locked Loop) circuit. The oscillation signal can be generated by the APLL circuit or the MPLL circuit. Alternatively, an oscillation signal can be generated by other circuits.

In 3022, the playing device performs frequency division processing on the oscillation signal based on the preset first frequency-division parameter, and obtains the frequency-divided clock signal, and determines the frequency of the clock signal as the sampling frequency of the playing device.

The playing device adjusts the frequency of the oscillation signal according to the preset first frequency-division parameter, thereby realizing the frequency division process on the oscillation signal, obtaining the clock signal different from the frequency of the oscillation signal, and determining the frequency of the clock signal as the sampling frequency of the playing device.

Since the sampling frequency of the playing device is determined according to the frequency of the oscillation signal and the frequency-division parameter, the first frequency-division parameter may be a frequency-division parameter determined by the playing device according to the frequency of the oscillation signal and the first sampling frequency, so as to ensure that the sampling frequency determined after the playing device performs frequency division processing on the oscillation signal based on the first frequency-division parameter is the same as the first sampling frequency of the electronic device, realizing the synchronization between the playing device and the electronic device.

In a possible implementation, the playing device includes a signal generator, a frequency divider and a player. The signal generator is connected to the frequency divider, and the frequency divider is connected to the player. The signal generator generates an oscillation signal, and the frequency divider performs frequency division processing on the oscillation signal according to the first frequency-division parameter to obtain a clock signal. The player determines the frequency of the clock signal as the sampling frequency, and extracts the audio sampling points from the buffer area according to the sampling frequency for playing audio.

Figure 4:
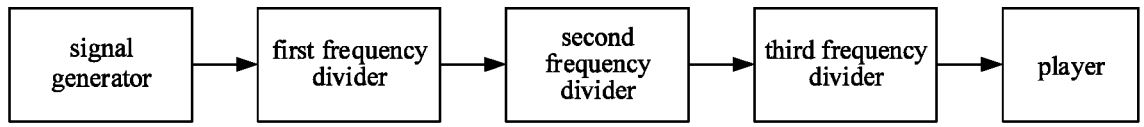
FIG. 4 is a flowchart showing a frequency division processing method according to an exemplary aspect of the present disclosure.

For example, FIG. 4 is a flowchart showing a frequency division processing method according to an exemplary aspect. Referring to FIG. 4, the playing device includes a signal generator, a first frequency divider, a second frequency divider, a third frequency divider and a player connected successively. During the working process of the playing device, the signal generator generates an oscillation signal and after the first frequency divider performs frequency division processing on the oscillation signal, the first frequency-divided signal is obtained; after the second frequency divider performs frequency division processing on the first signal, the second frequency-divided signal is obtained; and after the third frequency divider performs frequency division processing on the second signal, a frequency-divided clock signal is obtained.

In an aspect, the playing device is provided with an ioctl interface, wherein ioctl is a function for managing the input and output channels of the device). By calling the interface, the frequency-division parameter of the frequency divider can be adjusted.

For example, the frequency-division parameter of the first frequency divider may be $7/625$, the frequency-division parameter of the second frequency divider may be $1/4$, and the frequency-division parameter of the third frequency divider may be $1/64$. When the sampling frequency to be obtained is f, the frequency of the second signal is f*64, the frequency of the first signal is f*64*4, and the frequency of the oscillation signal is f*64*4*625/7.

In step 303, the playing device detects the number of audio sampling points in the buffer area during the playing process.

The playing device extracts the audio sampling points from the buffer area according to the determined sampling frequency. At this time, the extracted audio sampling points are no longer included in the buffer area, and other audio sampling points yet not to be played remain in the buffer area. The electronic device decodes according to the first sampling frequency, and continues to send the audio sampling points obtained by sampling to the playing device.

During the operation of the playing device, the temperature of the environment may change, causing the playing device to generate a zero drift phenomenon. Accordingly, the sampling frequency of the playing device changes, which may not be equal to the first sampling frequency of the electronic device. The difference between the sampling frequency of the playing device and the first sampling frequency of the electronic device may result in different numbers of audio sampling points in the buffer area, and also different playing effects of the audio data.

The magnitude relationship between the sampling frequency of the playing device and the first sampling frequency of the electronic device includes the following three types.

1. The sampling frequency of the playing device is less than the first sampling frequency of the electronic device.

When the sampling frequency of the playing device is less than the first sampling frequency of the electronic device, the rate at which the playing device extracts the audio sampling points from the buffer area is smaller than the rate at which the electronic device sends the audio sampling points to the playing device, which may result in the number of the audio sampling points in the buffer area gradually increasing.

2. The sampling frequency of the playing device is equal to the first sampling frequency of the electronic device.

When the sampling frequency of the playing device is equal to the first sampling frequency of the electronic device, the rate at which the playing device extracts the audio sampling points from the buffer area is equal to the rate at which the electronic device sends the audio sampling point to the playing device, which may result in the number of the audio sampling points in the buffer area constant.

3. The sampling frequency of the playing device is greater than the first sampling frequency of the electronic device.

When the sampling frequency of the playing device is greater than the first sampling frequency of the electronic device, the rate at which the playing device extracts the audio sampling points from the buffer area is greater than the rate at which the electronic device sends the audio sampling point to the playing device, which may result in the number of the audio sampling points in the buffer area gradually decreasing.

The number of audio sampling points in the buffer area may indicate the magnitude relationship between the sampling frequency of the playing device and the first sampling frequency of the electronic device to some extent. Therefore, the default quantity range may be set first, and the default quantity range is a quantity range which the number of audio sampling points in the buffer area should be within when the sampling frequency of the playing device and the first sampling frequency of the electronic device are equal. During the playing of the audio data by the playing device, the number of the audio sampling points in the buffer area may be detected, and it is determined whether the quantity is within the default quantity range, so as to determine the magnitude relationship between the sampling frequency of the playing device and the first sampling frequency of the electronic device according to the determination result.

The default quantity range may be determined according to the number of audio sampling points in the buffer area when the sampling frequency of the playing device and the first sampling frequency of the electronic device are equal. For example, the quantity may be determined as a center value of the default quantity range. The quantity is decreased by a preset amplitude, and then a first quantity is obtained. The quantity is increased by a preset amplitude, and then a second quantity is obtained. The range determined with the first quantity and the second quantity is taken as the default quantity range.

In a possible implementation, the playing device may detect the number of audio sampling points in the buffer area once every preset time period, where the preset time period may be 0.01 seconds, 0.1 seconds, or 1 second. Alternatively, the playing device may detect the number of audio sampling points in the buffer area each time the audio sampling point sent by the electronic device is received, or the playing device may detect the number of audio sampling points in the buffer area according to other manners.

By detecting the number of audio sampling points in the buffer area, the magnitude relationship between the sampling frequency of the playing device and the first sampling frequency of the electronic device can be determined, which improves flexibility and intelligence.

In step 304, when the first quantity detected by the playing device is not within the default quantity range, the preset first frequency-division parameter is adjusted to obtain a second frequency-division parameter.

Taking the number of audio sampling points in the buffer area of the current detection as the first quantity as an example, when the first quantity is not within the default quantity range, it indicates that the sampling frequency of the playing device is not equal to the sampling frequency of the electronic device. The playing device and the electronic device are out of synchronization, and at this time, the sampling frequency of the playing device needs to be adjusted.

The present disclosure adjusts the sampling frequency of the playing device by adjusting the frequency-division parameter, and the default quantity range includes a maximum boundary value and a minimum boundary value. By comparing the detected first quantity, the maximum boundary value, and the minimum boundary value, it can be determined whether the first quantity is within the default quantity range. When the first quantity is not within the default quantity range, the first frequency-division parameter may be adjusted according to the magnitude relationship between the first quantity and the maximum boundary value or the minimum boundary value, to obtain the second frequency-division parameter. The change trend of the frequency-division parameter is determined according to a magnitude relationship between the first quantity and the maximum boundary value or a magnitude relationship between the first quantity and the minimum boundary value.

The magnitude relationship between the first quantity and the minimum boundary value of the default quantity range includes the following two types.
1. The first quantity is less than the minimum boundary value of the default quantity range.
2. The first quantity is not less than the minimum boundary value of the default quantity range.

The magnitude relationship between the first quantity and the maximum boundary value of the default quantity range includes the following two types.
1. The first quantity is not greater than the maximum boundary value of the default quantity range.
2. The first number is greater than the maximum boundary value of the default quantity range.

When the first quantity is not less than the minimum boundary value of the default quantity range and is not greater than the maximum boundary value of the default quantity range, it may be determined that the first quantity is within the default quantity range. However, when the first quantity is less than the minimum boundary value of the default quantity range or when the first quantity is greater than the maximum boundary value of the default quantity range, it is determined that the first quantity is not within the default quantity range, and the first frequency-division parameter needs to be adjusted at this time.

When the first quantity detected by the playing device is less than the minimum boundary value of the default quantity range, it is indicated that the number of audio sampling points in the buffer area is small, and the sampling frequency of the playing device is greater than the first sampling frequency of the electronic device. The playing device decreases the first frequency-division parameter to decrease the sampling frequency. At this time, the rate at which the playing device extracts the audio sampling points becomes slow, and the number of audio sampling points in the buffer area increases, which is close to the default quantity range.

However, when the first quantity detected by the playing device is greater than the maximum boundary value of the default quantity range, it is indicated that the number of audio sampling points in the buffer area is large, and the sampling frequency of the playing device is smaller than the first sampling frequency of the electronic device. The playing device increases the first frequency-division parameter to increase the sampling frequency. At this time, the rate at which the playing device extracts the audio sampling points becomes fast, and the number of audio sampling points in the buffer area decreases, which is close to the default quantity range.

The aspect of the present disclosure adjusts the sampling frequency by adjusting the frequency-division parameter of the playing device, and decreases the difference between the sampling frequency of the playing device and the first sampling frequency of the electronic device, so that the playing device and the electronic device tend to synchronize.

The process of adjusting the sampling frequency by the playing device may include the following steps 3041-3042.

In 3041, when the first quantity is greater than a maximum boundary value of the default quantity range, the first frequency-division parameter is increased to obtain a second frequency-division parameter.

In a possible implementation, the first frequency-division parameter is increased by a first preset threshold to obtain a second frequency-division parameter. For example, the first preset threshold may be 0.02, 0.03, or other values.

In another possible implementation, the first frequency-division parameter is increased according to a first preset ratio to obtain the second frequency-division parameter. That is, the product of the first preset ratio and the first frequency-division parameter is calculated to obtain the second frequency-division parameter. The first preset ratio is a value greater than 1, and may be, for example, 1.01, 1.04, or other values.

In another possible implementation, the first frequency-division parameter is a ratio between the preset numerator parameter and the preset denominator parameter. The frequency-division parameter may be adjusted by adjusting the preset numerator parameter or the preset denominator parameter.

When the first frequency-division parameter is to be increased, the preset numerator parameter is increased in a case that the preset denominator parameter is kept unchanged, to obtain a ratio between an increased preset numerator parameter and the preset denominator parameter as the second frequency-division parameter. Or, when the first frequency-division parameter is to be increased, the preset denominator parameter is decreased in a case that the preset numerator parameter is kept unchanged, to obtain a ratio between the preset numerator parameter and a decreased preset denominator parameter as the second frequency-division parameter. When the preset numerator parameter is adjusted or the preset numerator parameter is adjusted, the adjustment may be performed by using a preset threshold or a preset ratio. The adjustment process is similar to the adjustment manners in the two possible implementation modes, and is not described herein.

For example, N represents a preset denominator parameter, M represents a preset numerator parameter, and M/N represents a frequency-division parameter. Taking the first frequency-division parameter being M1/N1 as an example, when the first frequency-division parameter is to be increased, M1 is increased by 1 in a case that N1 is kept unchanged, to obtain the second frequency-division parameter as (M1+1)/N1. Or, N1 is decreased by 1 in a case that M1 is kept unchanged, to obtain the second frequency-division parameter as M1/(N1−1).

In the above step 3041, when the first quantity is greater than the maximum boundary value of the default quantity range, it is indicated that the current playing speed of the playing device is too slow. Therefore, by increasing the frequency-division parameter, the sampling frequency is increased, thereby increasing the playing speed.

In 3042, when the first quantity is less than a minimum boundary value of the default quantity range, the first frequency-division parameter is decreased to obtain a second frequency-division parameter.

In a possible implementation, the first frequency-division parameter is decreased by a second preset threshold to obtain a second frequency-division parameter. For example, the second preset threshold may be 0.02, 0.03, or other values.

In another possible implementation, the first frequency-division parameter is decreased according to the second preset ratio to obtain a second frequency-division parameter. The second preset ratio is a value less than 1, and may be, for example, 0.98, 0.95 or other values.

The first preset threshold and the second preset threshold may be equal, or the first preset threshold and the second preset threshold may not be equal.

In another possible implementation, the first frequency-division parameter is a ratio between the preset numerator parameter and the preset denominator parameter. The frequency-division parameter may be adjusted by adjusting the preset numerator parameter or the preset denominator parameter.

When the first frequency-division parameter is to be decreased, the preset numerator parameter is decreased in a case that the preset denominator parameter is kept unchanged, to obtain a ratio between a decreased preset numerator parameter and the preset denominator parameter as the second frequency-division parameter. Or, when the first frequency-division parameter is to be decreased, the preset denominator parameter is increased in a case that the preset numerator parameter is kept unchanged, to obtain a ratio between the preset numerator parameter and an increased preset denominator parameter as the second frequency-division parameter. When the preset numerator parameter is adjusted or the preset numerator parameter is adjusted, the adjustment may also be performed by using a preset threshold or a preset ratio. The adjustment process is similar to the adjustment manners in the two possible implementation modes, and is not described herein.

For example, N represents a preset denominator parameter, M represents a preset numerator parameter, and M/N represents a frequency-division parameter. Taking the first frequency-division parameter being M1/N1 as an example, when the first frequency-division parameter is to be decreased, M1 is decreased by 1 in a case that N1 is kept unchanged, to obtain the second frequency-division parameter as (M1−1)/N1. Or, N1 is increased by 1 in a case that M1 is kept unchanged, to obtain the second frequency-division parameter as M1/(N1+1).

In the above step 3042, when the first quantity is less than the minimum boundary value of the default quantity range, it is indicated that the current playing speed of the playing device is too fast. Therefore, by decreasing the frequency-division parameter, the sampling frequency is decreased, thereby decreasing the playing speed.

When the frequency-division parameter in the aspect of the present disclosure is a ratio between the preset numerator parameter and the preset denominator parameter, since the preset numerator parameter is smaller than the preset denominator parameter, compared with the adjustment of the preset numerator parameter, when the preset denominator parameter is adjusted according to the same amplitude, the variation amplitude of the frequency-division parameter is smaller, the influence on the sampling frequency of the playing device is smaller, and the influence on the playing effect of the audio data is also smaller. Therefore, when the frequency-division parameter is adjusted, the preset denominator can be adjusted without adjusting the preset numerator parameter.

It should be noted that since the variation of the sampling frequency affects the playing effect of the audio data, a fine adjustment mode should be adopted to ensure that the amplitude of variation of the frequency-division parameter is as small as possible, so that the amplitude of variation of the sampling frequency is as small as possible, to avoid the difference between the sampling frequency of the playing device and the normal sampling frequency being too large, thereby ensuring that the playing effect of the playing device is not affected, and the human ear will not have a distinct feeling when listening to the audio data. That is to say, the adjustment is performed by the preset threshold or the preset ratio, the adopted preset threshold should be as small as possible, and the adopted preset ratio should be as close as possible to 1.

In the aspect, when the first quantity is less than the default quantity range, it indicates that the sampling frequency of the playing device is greater than the first sampling frequency of the electronic device. At this time, if the amplitude of decrease of the frequency-division parameter is small, the sampling frequency determined based on the decreased frequency-division parameter is still greater than the first sampling frequency, then the difference between the sampling frequency of the playing device and the first sampling frequency becomes small. The number of audio sampling points in the buffer area will still decrease, but the decreasing speed will be slowed down, which avoids affecting the playing effect due to the electronic device and the playing device being out of synchronization as much as possible. Or, if the amplitude of decrease of the frequency-division parameter is large, resulting that the sampling frequency of the playing device determined based on the decreased frequency-division parameter is smaller than the first sampling frequency, then the difference between the sampling frequency of the playing device and the first sampling frequency also becomes small. At this time, the number of audio sampling points in the buffer area will gradually increase, and gradually approach the default quantity range, which can ensure the playing effect of the audio data.

When the first quantity is greater than the default quantity range, it indicates that the sampling frequency of the playing device is less than the first sampling frequency of the electronic device. At this time, if the amplitude of increase of the frequency-division parameter is small, the sampling frequency determined based on the increased frequency-division parameter is still less than the first sampling frequency, then the difference between the sampling frequency of the playing device and the first sampling frequency becomes small. At this time, the number of audio sampling points in the buffer area will still increase, but the increasing speed will be slowed down, which avoids affecting the playing effect due to the electronic device and the playing device being out of synchronization as much as possible. Or, if the amplitude of increase of the frequency-division parameter is large, resulting that the sampling frequency of the playing device determined based on the increased frequency-division parameter is greater than the first sampling frequency, then the difference between the sampling frequency of the playing device and the first sampling frequency also becomes small. At this time, the number of audio sampling points in the buffer area will gradually decrease, and gradually approach the default quantity range, which can ensure the playing effect of the audio data.

In a possible implementation, in the process of adjusting the first frequency-division parameter to obtain the second frequency-division parameter, the first frequency-division parameter may be adjusted multiple times, and the second frequency-division parameter is obtained after multiple adjustments, so that it can be guaranteed that the amplitude of each adjustment is small, so as to avoid affecting the playing effect as much as possible.

For example, when the first frequency-division parameter is increased, the first frequency-division parameter may be increased multiple times, and the amplitude of each increase is small. Alternatively, when the first frequency-division parameter is decreased, the first frequency-division parameter may be decreased multiple times, and the magnitude of each decrease is small.

In step 305, the playing device determines a second sampling frequency based on the second frequency-division parameter, and extracts the audio sampling points from the buffer area according to the second sampling frequency for playing audio.

After the playing device determines the second frequency-division parameter, the second sampling frequency may be determined based on the second frequency-division parameter, and the audio sampling points are extracted from the buffer area according to the second sampling frequency for playing audio, thereby realizing the playing effect of the audio data.

In the process of determining the second sampling frequency based on the second frequency-division parameter, the playing device first performs frequency division processing on the oscillation signal generated by the playing device based on the second frequency-division parameter to obtain a clock signal, and determines the frequency of the clock signal as the second sampling frequency. Then the playing device can extract audio sampling points from the buffer area according to the second sampling frequency for playing audio.

In step 306, the playing device continues to detect the number of audio sampling points in the buffer area.

The process of detecting the number of audio sampling points in the buffer area in step 306 is similar to the process in step 303, and details are not described herein again.

In step 307, when the second quantity detected by the playing device is within the default quantity range, the second frequency-division parameter is restored to the first frequency-division parameter.

After the playing device detects the second quantity of the audio sampling points in the buffer area, it may determine, according to the second quantity, whether the number of audio sampling points in the buffer area is within a default quantity range. When the playing device extracts the audio sampling points from the buffer area according to the second sampling frequency, the number of audio sampling points in the buffer area is gradually adjusted, so that the number of audio sampling points in the buffer area gradually approaches the default quantity range. When the number of audio sampling points in the buffer area is within the default quantity range, it indicates that the current playing speed of the playing device is normal, and the current sampling frequency of the playing device is close to the first sampling frequency of the electronic device, and the playing device has been synchronized with the electronic device. At this time, the second frequency-division parameter is restored to the first frequency-division parameter.

By restoring the second frequency-division parameter to the first frequency-division parameter, the current sampling frequency of the playing device is adjusted to the third sampling frequency, and the third sampling frequency is close to the sampling frequency of the electronic device, and the playing device continues to extract the audio sampling points from the buffer area according to the third sampling frequency for playing audio, so that the playing device and the electronic device are synchronized to ensure the playing effect of the audio data.

In the aspect, when the playing device does not have a zero drift phenomenon caused by the influence of temperature, the frequency of the oscillation signal is fixed, and the third sampling frequency determined according to the first frequency-division parameter is the same as the first sampling frequency. At this time, the electronic device is synchronized with the playing device. However, when the zero drift phenomenon occurs in the playing device due to the influence of temperature, even if the influence of temperature causes the zero drift phenomenon, the influence on the frequency of the oscillation signal is small, and variation amplitude of the frequency of the oscillation signal is also small, and the difference between the third sampling frequency determined according to the first frequency-division parameter and the first sampling frequency is also small, and the playing device and the electronic device can be still considered to be close to synchronization at this time.

In a possible implementation, when the playing device only adjusts the first frequency-division parameter one time to obtain the second frequency-division parameter, the playing device may restore the second frequency-division parameter according to the adjustment amplitude between the first frequency-division parameter and the second frequency-division parameter, thereby restoring the second frequency-division parameter to the first frequency-division parameter.

In another possible implementation, when the playing device performs multiple adjustments on the first frequency-division parameter to obtain the second frequency-division parameter, the adjustment amplitude of each time is recorded, and the playing device can sequentially restore the frequency-division parameter according to the adjustment amplitude of each time, thereby obtaining the first frequency-division parameter. Or, when the playing device performs multiple adjustments on the frequency-division parameter, the adjustment amplitude of each time is recorded, and the total adjustment amplitude of the multiple adjustment amplitudes is calculated. The frequency-division parameter is restored according to the total adjustment amplitude, thereby obtaining the first frequency-division parameter.

When the first quantity is less than the minimum boundary value of the default quantity range and the adjusted sampling frequency of the playing device is less than the first sampling frequency of the electronic device, the number of audio sampling points in the buffer area will gradually approach the default quantity range. After that, the number of audio sampling points in the buffer area will be within the default quantity range, and the electronic device is synchronized with the playing device. If the playing continues to be performed according to the adjusted sampling frequency, the number of audio sampling points in the buffer area may be greater than the maximum boundary value of the default quantity range, which will cause the electronic device to be out of synchronization with the playing device again. In order to prevent the number of audio sampling points in the buffer area from being greater than the maximum boundary value of the default quantity range, the number of audio sampling points in the buffer area will be continuously detected after the sampling frequency is adjusted. When the detected second quantity is within the default quantity range, the second frequency-division parameter of the playing device is restored to the first frequency-division parameter.

Or, when the first quantity is greater than the maximum boundary value of the default quantity range and the adjusted sampling frequency of the playing device is greater than the first sampling frequency of the electronic device, the number of audio sampling points in the buffer area will gradually approach the default quantity range. After this, the number of audio sampling points in the buffer area will be within the default quantity range. At this time, the electronic device is synchronized with the playing device. If the playing continues to be performed according to the adjusted sampling frequency, the number of audio sampling points in the buffer area may be less than the minimum boundary value of the default quantity range, which will cause the electronic device to be out of synchronization with the playing device again. In order to prevent the number of audio sampling points in the buffer area from being less than the minimum boundary value of the default quantity range, the number of audio sampling points in the buffer area will be continuously detected after the sampling frequency is adjusted. When the detected second quantity is within the default quantity range, the second frequency-division parameter of the playing device is restored to the first frequency-division parameter.

After the first frequency-division parameter is adjusted to the second frequency-division parameter, when the second quantity detected is within the default quantity range, the second frequency-division parameter is restored to the first frequency-division parameter, so that when the difference between the sampling frequency of the playing device and the sampling frequency of the electronic device is small and the playing device and the electronic device have been synchronized, the frequency-division parameter is restored in time, to avoid the difference between the sampling frequency of the playing device and the sampling frequency of the electronic device from being enlarged again, thereby ensuring the playing effect of the audio data.

In step 308, the playing device determines the third sampling frequency based on the first frequency-division parameter, and extracts the audio sampling points from the buffer area according to the third sampling frequency for playing audio.

The process of step 308 is similar to the process of step 302, and will not be repeated herein.

By restoring the frequency-division parameter of the playing device to the first frequency-division parameter, the sampling frequency of the playing device is determined based on the first frequency-division parameter, the sampling frequency of the playing device is ensured to be close to the first sampling frequency of the electronic device. The situation that the sampling frequency of the playing device is greatly different from the first sampling frequency is avoided, so that the playing device and the electronic device tend to be synchronous, and the playing effect of the audio data is also ensured.

In the method provided by the aspect of the present disclosure, the electronic device decodes the audio data, and sends the obtained audio sampling points to the playing device according to the first sampling frequency, and the playing device stores the audio sampling points in the buffer area, and determines a sampling frequency based on the first frequency-division parameter, and extracts the audio sampling points from the buffer area according to the sampling frequency. Besides, the number of the audio sampling points in the buffer area is detected, and when the first quantity detected is not within the default quantity range, the first frequency-division parameter is adjusted to obtain the second frequency-division parameter; and then the second sampling frequency is determined based on the second frequency-division parameter, and the audio sampling points are extracted from the buffer area according to the second sampling frequency for playing audio. It is determined whether the electronic device and the playing device are synchronized according to whether the number of audio sampling points in the buffer area is within the default quantity range, so that when the electronic device and the playing device are not synchronized, the frequency-division parameter is adjusted to adjust the sampling frequency of the playing device, and to decrease the difference between the sampling frequency of the playing device and the first sampling frequency of the electronic device, so that the playing device and the electronic device tend to be synchronized, and it is ensured that the playing effect of the audio data will not be affected.

Furthermore, after the first frequency-division parameter is adjusted to the second frequency-division parameter, when the second quantity detected is within the default quantity range, the second frequency-division parameter is restored to the first frequency-division parameter, so that when the difference between the sampling frequency of the playing device and the sampling frequency of the electronic device is small and the playing device and the electronic device have been synchronized, the frequency-division parameter is restored in time, to avoid the difference between the sampling frequency of the playing device and the sampling frequency of the electronic device from being enlarged again, thereby ensuring the playing effect of the audio data.

It should be noted that, in the related art, in order to solve the problem that the electronic device and the playing device are not synchronized, the playing device resamples the audio sampling points in the buffer area by using a resampling algorithm to obtain the audio sampling points after resampling, so that when the playing device performs playing according to the determined sampling frequency, the number of the audio sampling points in the buffer area can meet the playing requirement, and the electronic device and the playing device are synchronous. In the above technical solution, the audio sampling points in the buffer area need to be resampled by using the resampling algorithm, and massive calculation is required to obtain the resampled audio sampling points, which are computationally intensive. Further, since the audio sampling points used during the playing have changed, the playing effect of the audio data is affected.

In the method provided by the aspect of the present disclosure, the sampling frequency of the playing device can be adjusted by adjusting the frequency-division parameter of the playing device, so that the playing speed of the playing device can be adjusted without mass calculation, and the calculation amount is decreased. There is no need to change the audio sampling points, and the playing effect of the audio data is ensured.

Figure 5:
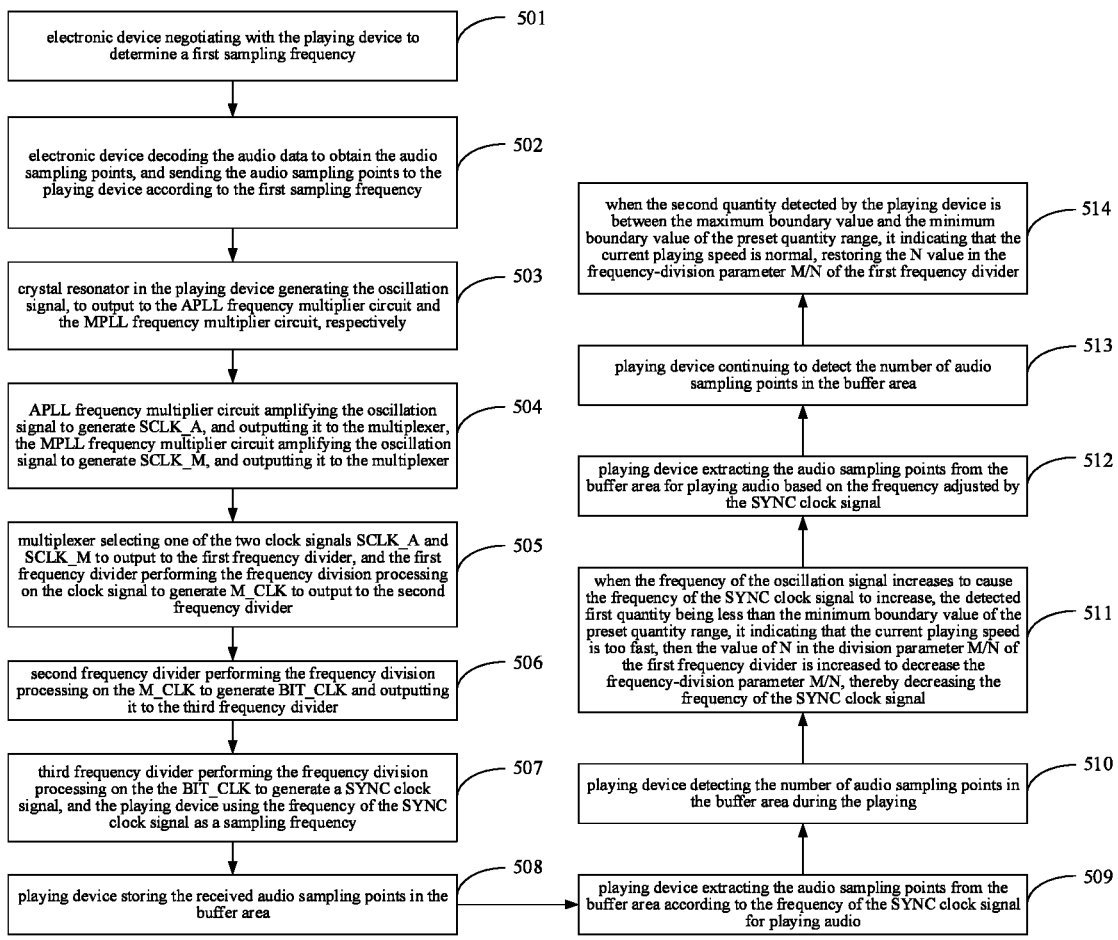
FIG. 5 is a flowchart showing another frequency division processing method according to an exemplary aspect of the present disclosure.
Figure 6:
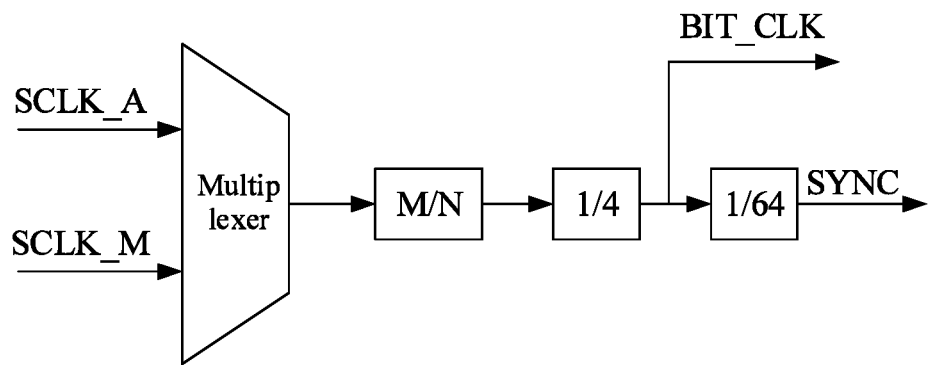
FIG. 6 is a flowchart showing another frequency division processing method according to an exemplary aspect of the present disclosure.

FIG. 5 is a flowchart showing another frequency division processing method according to an exemplary aspect. FIG. 6 is a flowchart showing another frequency division processing method according to an exemplary aspect. As shown in FIG. 5 and FIG. 6, the method includes following steps.

In step 501, the electronic device negotiates with the playing device to determine a first sampling frequency.

In step 502, the electronic device decodes the audio data to obtain the audio sampling points, and sends the audio sampling points to the playing device according to the first sampling frequency.

In step 503, the crystal resonator in the playing device generates oscillation signals, which are output to the APLL frequency multiplier circuit and the MPLL frequency multiplier circuit, respectively. In the aspect, the crystal resonator has a frequency of 24 MHz (megahertz).

In step 504, the APLL frequency multiplier circuit amplifies the oscillation signal to generate SCLK_A (A clock signal), and outputs it to the multiplexer. The MPLL frequency multiplier circuit amplifies the oscillation signal to generate SCLK_M (M clock signal), and outputs it to the multiplexer.

In step 505, the multiplexer selects one of the two clock signals SCLK_A and SCLK_M to output to the first frequency divider. The first frequency divider performs the frequency division processing on the clock signal to generate M_CLK (Main CLOCK, a main clock signal) to output to the second frequency divider. In the aspect, the frequency-division parameter of the first frequency divider is M/N.

In step 506, the second frequency divider performs frequency division processing on the M_CLK to generate BIT_CLK (a bit synchronous clock signal) and outputs it to the third frequency divider. In the aspect, the frequency-division parameter of the second frequency divider is 1/4.

In step 507, the third frequency divider performs frequency division processing on the BIT_CLK to generate a SYNC (synchronization) clock signal, and the playing device uses the frequency of the SYNC clock signal as a sampling frequency. In the aspect, the frequency-division parameter of the third frequency divider is 1/64.

If the sampling frequency determined by the negotiation between the electronic device and the playing device is Fs, the frequency of the SYNC clock signal is required to be Fs. It is assumed that the frequency of SCLK_A selected in the two clock signals SCLK_A and SCLK_M is Fin, Fs=Fin*M/N*1/4*1/64.

The frequency-division parameter M/N of the first frequency divider is a frequency-division parameter determined according to the sampling frequency Fs and the frequency Fin of the SCLK_A, so as to ensure that the sampling frequency determined after the playing device performs the frequency division processing based on the frequency-division parameter M/N, the frequency-division parameter of the second frequency divider and the frequency-division parameter of the third frequency divider is equal to Fs, thereby realizing the synchronization of the playing device and the electronic device.

For example, if the sampling frequency Fs is 44100 Hz and the frequency Fin of SCLK_A is 1008 MHz, it can be determined that the value of M can be 7 and the value of N can be 625 according to the above formula Fs=Fin*M/N*1/4*1/64.

In step 508, the playing device stores the received audio sampling points in the buffer area.

In step 509, the playing device extracts the audio sampling points from the buffer area according to the frequency of the SYNC clock signal for playing.

In step 510, the playing device detects the number of audio sampling points in the buffer area during playing.

In step 511, when the frequency of the oscillation signal increases to cause the frequency of the SYNC clock signal to increase, the detected first quantity is less than the minimum boundary value of the default quantity range, it indicates that the current playing speed is too fast, then the value of N in the division parameter M/N of the first frequency divider is increased to decrease the frequency-division parameter M/N, thereby decreasing the frequency of the SYNC clock signal.

In another aspect, when the frequency of the oscillation signal decreases to cause the frequency of the SYNC clock signal to decrease, the detected first quantity is greater than the maximum boundary value of the default quantity range, it indicates that the current playing speed is too slow, then the value of N in the division parameter M/N of the first frequency divider is decreased to increase the frequency-division parameter M/N, thereby increasing the frequency of the SYNC clock signal.

In step 512, the playing device extracts the audio sampling points from the buffer area for playing based on the frequency adjusted by the SYNC clock signal.

In step 513, the playing device continues to detect the number of audio sampling points in the buffer area.

In step 514, when the second quantity detected by the playing device is between the maximum boundary value and the minimum boundary value of the default quantity range, it indicates that the current playing speed is normal, the N value in the frequency-division parameter M/N of the first frequency divider is restored.

Figure 7:
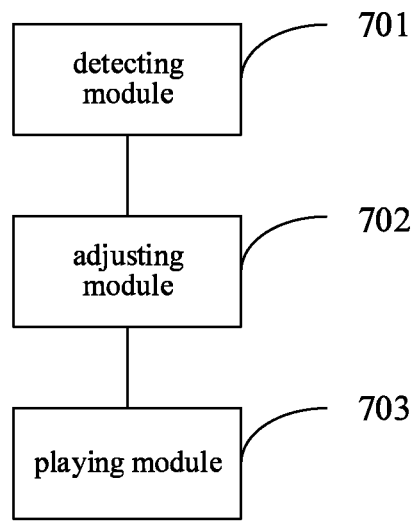
FIG. 7 is a schematic structural diagram showing an apparatus for playing audio according to an exemplary aspect of the present disclosure.

FIG. 7 is a schematic structural diagram showing an apparatus for playing audio according to an exemplary aspect. Referring to FIG. 7, the apparatus includes: a detecting module 701, an adjusting module 702, and a playing module 703.

The detecting module 701 is configured to detect the number of audio sampling points in a buffer area, the buffer area being used to store the audio sampling points sent by an electronic device according to a first sampling frequency, wherein the audio sampling points are obtained by decoding audio data by the electronic device.

The adjusting module 702 is configured to adjust a preset first frequency-division parameter for determining a second frequency-division parameter, when a first quantity detected is not within a default quantity range.

The playing module 703 is configured to determine a second sampling frequency based on the second frequency-division parameter, and extract the audio sampling points from the buffer area according to the second sampling frequency for playing audio.

In one possible implementation, the adjusting module 702 includes:

an increasing unit, configured to: increase the first frequency-division parameter to obtain the second frequency-division parameter, when the first quantity is greater than a maximum boundary value of the default quantity range.

In another possible implementation, the increasing unit is further configured to increase the first frequency-division parameter by a first preset threshold to obtain the second frequency-division parameter; or the increasing unit is further configured to increase the first frequency-division parameter according to a first preset ratio to obtain the second frequency-division parameter.

In another possible implementation, the first frequency-division parameter is a ratio between a preset numerator parameter and a preset denominator parameter;

the increasing unit is further configured to increase the preset numerator parameter in a case that the preset denominator parameter is kept unchanged, to obtain a ratio between an increased preset numerator parameter and the preset denominator parameter as the second frequency-division parameter; or the increasing unit is further configured to decrease the preset denominator parameter in a case that the preset numerator parameter is kept unchanged, to obtain a ratio between the preset numerator parameter and a decreased preset denominator parameter as the second frequency-division parameter.

In another possible implementation, the adjusting module 702 includes:

a decreasing unit, configured to decrease the first frequency-division parameter to obtain the second frequency-division parameter, when the first quantity is less than a minimum boundary value of the default quantity range.

In another possible implementation, the decreasing unit is further configured to decrease the first frequency-division parameter by a second preset threshold to obtain the second frequency-division parameter; or the decreasing unit is further configured to decrease the first frequency-division parameter according to a second preset ratio to obtain the second frequency-division parameter.

In another possible implementation, the first frequency-division parameter is the ratio between the preset numerator parameter and the preset denominator parameter.

The decreasing unit is further configured to decrease the preset numerator parameter in a case that the preset denominator parameter is kept unchanged, to obtain a ratio between a decreased preset numerator parameter and the preset denominator parameter as the second frequency-division parameter; or the decreasing unit is further configured to increase the preset denominator parameter in a case that the preset numerator parameter is kept unchanged, to obtain a ratio between the preset numerator parameter and an increased preset denominator parameter as the second frequency-division parameter.

In another possible implementation, the playing module 703 includes:

a determining unit, configured to perform frequency division processing on a generated oscillation signal to obtain a clock signal based on the second frequency-division parameter, and determine a frequency of the clock signal as the second sampling frequency.

In another possible implementation, the detecting module 701 is further configured to continue to detect the number of the audio sampling points in the buffer area.

The adjusting module 702 is further configured to restore the second frequency-division parameter as the first frequency-division parameter, when a second quantity detected is within the default quantity range; and the playing module 703 is further configured to determine a third sampling frequency based on the first frequency-division parameter, and extract the audio sampling points from the buffer area according to the third sampling frequency for playing audio.

In the apparatus provided by the aspect of the present disclosure, the electronic device decodes the audio data, and sends the obtained audio sampling points to the playing device according to the first sampling frequency. The playing device stores the audio sampling points in the buffer area, and determines a sampling frequency based on the first frequency-division parameter, and extracts the audio sampling points from the buffer area according to the sampling frequency. Besides, the number of the audio sampling points in the buffer area is detected, and when the first quantity detected is not within the default quantity range, the first frequency-division parameter is adjusted to obtain the second frequency-division parameter. The second sampling frequency is determined based on the second frequency-division parameter, and the audio sampling points are extracted from the buffer area according to the second sampling frequency for playing audio. It is determined whether the electronic device and the playing device are synchronized according to whether the number of audio sampling points in the buffer area is within the default quantity range, so that when the electronic device and the playing device are not synchronized, the frequency-division parameter is adjusted to adjust the sampling frequency of the playing device, and to decrease the difference between the sampling frequency of the playing device and the first sampling frequency of the electronic device, so that the playing device and the electronic device tend to be synchronized, and it is ensured that the playing effect of the audio data will not be affected.

It should be noted that, the apparatus for playing audio provided in the foregoing aspect is only illustrated by the division of each functional module when playing audio data. In actual applications, the above functions are distributed to different functional modules as needed, that is, the internal structure of the playing device is divided into different functional modules to complete all or part of the functions described above. In addition, the apparatus for playing audio provided in the foregoing aspect is the same as the audio playing method aspect and the specific implementation process is described in detail in the method aspect, and details are not described herein again.

The beneficial effects brought by the technical solutions provided by the aspects of the present disclosure at least include the following.

In the audio playing method, apparatus, playing device and storage medium provided by the aspect of the present disclosure, the electronic device decodes the audio data, and sends the obtained audio sampling points to the playing device according to the first sampling frequency. The playing device stores the audio sampling points in the buffer area, and determines a sampling frequency based on the first frequency-division parameter, and extracts the audio sampling points from the buffer area according to the sampling frequency. Besides, the number of the audio sampling points in the buffer area is detected, and when the first quantity detected is not within the default quantity range, the first frequency-division parameter is adjusted to obtain the second frequency-division parameter; and then the second sampling frequency is determined based on the second frequency-division parameter. The audio sampling points are extracted from the buffer area according to the second sampling frequency for playing audio. It is determined whether the electronic device and the playing device are synchronized according to whether the number of audio sampling points in the buffer area is within the default quantity range, so that when the electronic device and the playing device are not synchronized, the frequency-division parameter is adjusted to adjust the sampling frequency of the playing device, and to decrease the difference between the sampling frequency of the playing device and the first sampling frequency of the electronic device, so that the playing device and the electronic device tend to be synchronized to ensure not affecting the playing effect of the audio data.

Furthermore, after the first frequency-division parameter is adjusted to the second frequency-division parameter, when the second quantity detected is within the default quantity range, the second frequency-division parameter is restored to the first frequency-division parameter, so that when the difference between the sampling frequency of the playing device and the sampling frequency of the electronic device is small and even the playing device and the electronic device have been synchronized, the frequency-division parameter is restored in time, to avoid the difference between the sampling frequency of the playing device and the sampling frequency of the electronic device from being enlarged again, thereby ensuring the playing effect of the audio data.

Figure 8:
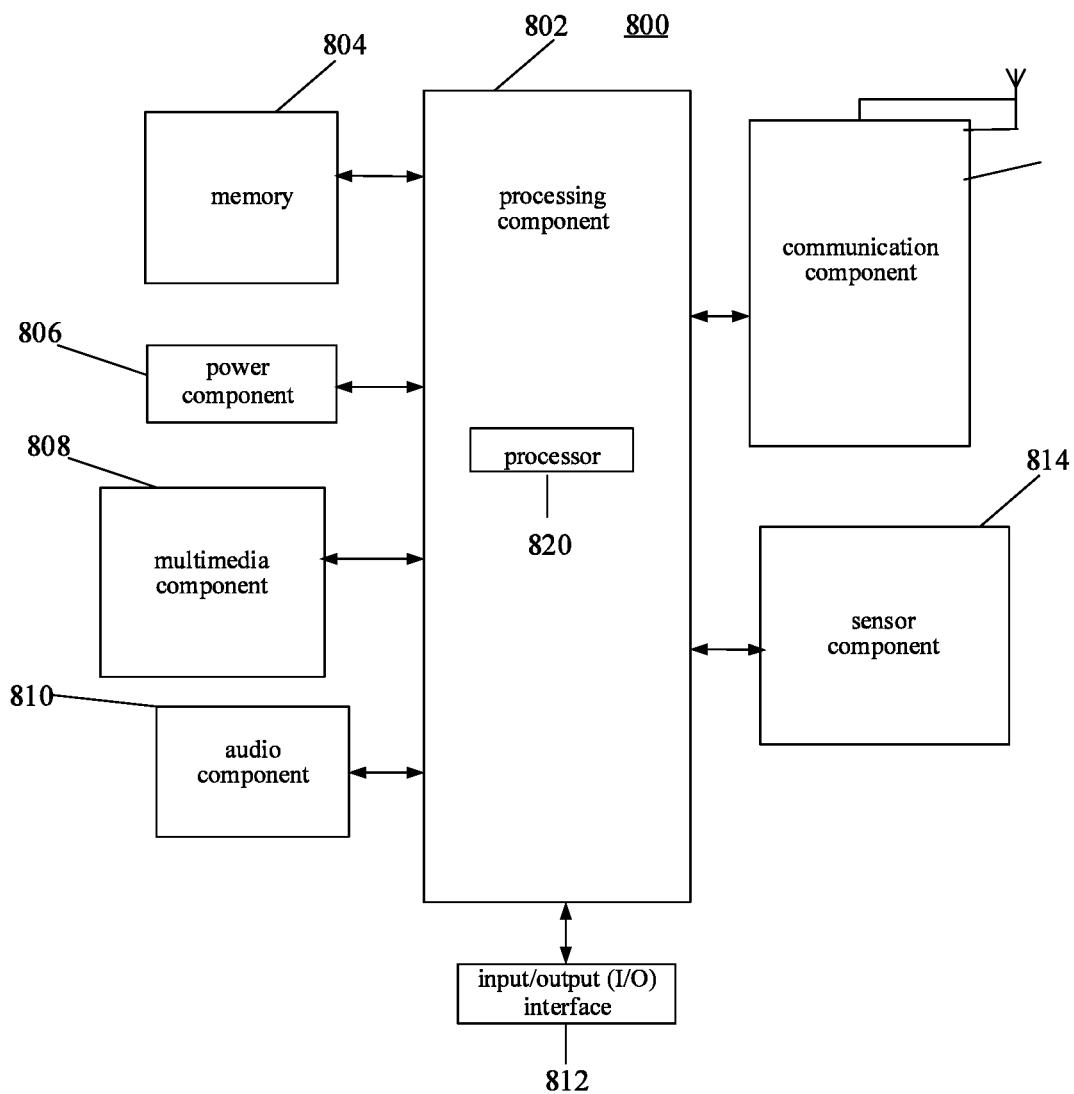
FIG. 8 is a block diagram showing a playing device according to an exemplary aspect of the present disclosure.

FIG. 8 is a block diagram showing a playing device according to an exemplary aspect. For example, the playing device 800 can be a mobile phone, a computer, a digital broadcasting apparatus, a messaging device, a game console, a tablet device, a medical device, a fitness device, a personal digital assistant, a speaker, a TV, etc.

Referring to FIG. 8, the playing device 800 may include: one or more of the following components: a processing component 802, a memory 804, a power component 806, a multimedia component 808, an audio component 810, an input/output (I/O) interface 812, a sensor component 814, and a communication component 816.

The processing component 802 typically controls the overall operations of the playing device 800, such as the operations associated with display, telephone calls, data communications, camera operations, and recording operations. The processing component 802 can include one or more processors 820 to execute instructions to perform all or part of the steps in the above described methods. Moreover, the processing component 802 can include one or more modules to facilitate the interaction between the processing component 802 and other components. For example, the processing component 802 can include a multimedia module to facilitate the interaction between the multimedia component 808 and the processing component 802.

The memory 804 is configured to store various types of data to support the operation of the playing device 800. Examples of such data include instructions for any application or method operated on device 800, such as the contact data, the phone book data, messages, pictures, videos, and the like. The memory 804 can be implemented by any type of volatile or non-volatile storage device, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 806 provides power to various components of the playing device 800. The power component 806 can include a power management system, one or more power sources, and other components associated with the generation, management, and distribution of power in the playing device 800.

The multimedia component 808 includes a screen providing an output interface between the playing device 800 and the user t. In some aspects, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 808 includes a front camera and/or a rear camera. When the playing device 800 is in an operation mode, such as a photographing mode or a video mode, the front camera and/or the rear camera can receive external multimedia datum. Each of the front camera and the rear camera may be a fixed optical lens system or have focus and optical zoom capability.

The audio component 810 is configured to output and/or input an audio signal. For example, the audio component 810 includes a microphone (MIC) configured to receive an external audio signal when the playing device 800 is in an operation mode, such as a call mode, a recording mode, and a voice recognition mode. The received audio signal may be further stored in the memory 804 or sent via the communication component 816. In some aspects, the audio component 810 also includes a speaker for outputting the audio signal.

The I/O interface 812 provides an interface between the processing component 802 and peripheral interface modules, such as a keyboard, a click wheel, buttons, and the like. These buttons may include, but are not limited to, a home button, a volume button, a starting button, and a locking button.

The sensor component 814 includes one or more sensors for providing status assessments of various aspects of the playing device 800. For example, the sensor component 814 can detect an open/closed status of the playing device 800, relative positioning of components, such as the display and the keypad of the playing device 800. The sensor component 814 can also detect a change in position of one component of the playing device 800 or the playing device 800, the presence or absence of user contact with the playing device 800, an orientation, or an acceleration/deceleration of the playing device 800, and a change in temperature of the playing device 800. The sensor component 814 can include a proximity sensor configured to detect the presence of nearby objects without any physical contact. The sensor component 814 can also include a light sensor, such as a CMOS or CCD image sensor, configured to use in imaging applications. In some aspects, the sensor component 814 can also include an accelerometer sensor, a gyroscope sensor, a magnetic sensor, a pressure sensor, or a temperature sensor.

The communication component 816 is configured to facilitate wired or wireless communication between the playing device 800 and other devices. The playing device 800 can access a wireless network based on a communication standard, such as Wi-Fi, 2G or 3G, or a combination thereof. In an exemplary aspect, the communication component 816 receives broadcast signals or broadcast associated information from an external broadcast management system via a broadcast channel. In an exemplary aspect, the communication component 816 also includes a near field communication (NFC) module to facilitate short-range communications.

In an exemplary aspect, the playing device 800 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, to perform the above audio playing method.

In an exemplary aspect, there is also provided a non-transitory computer-readable storage medium including instructions, such as a memory 804 including instructions executable by the processor 820 of the terminal 800 to perform the above described method. For example, the non-transitory computer readable storage medium may be a ROM, a random access memory (RAM), a CD-ROM, a magnetic tape, a floppy disc, and an optical data storage device.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for playing audio data, comprising:
   detecting an amount of audio sampling points in a buffer area that is configured to store the audio sampling points received from an electronic device based on a first sampling frequency, wherein the audio sampling points are obtained by decoding the audio data from the electronic device;
   when a first quantity of the sampling points based on the first sampling frequency is out of a default quantity range, adjusting a preset first frequency-division parameter to obtain a second frequency-division parameter;
   determining a second sampling frequency based on the second frequency-division parameter; and
   extracting the audio sampling points from the buffer area based on the second sampling frequency for playing the audio data.

2. The method according to claim 1, wherein adjusting the preset first frequency-division parameter to obtain the second frequency-division parameter comprises:
   increasing the first frequency-division parameter to obtain the second frequency-division parameter when the first quantity is greater than a maximum boundary value of the default quantity range.

3. The method according to claim 2, wherein increasing the first frequency-division parameter to obtain the second frequency-division parameter comprises:
   increasing the first frequency-division parameter by a first preset threshold to obtain the second frequency-division parameter; or
   increasing the first frequency-division parameter based on a first preset ratio to obtain the second frequency-division parameter.

4. The method according to claim 2, wherein the first frequency-division parameter is a ratio between a preset numerator parameter and a preset denominator parameter, and increasing the first frequency-division parameter to obtain the second frequency-division parameter comprises:
   increasing the preset numerator parameter when the preset denominator parameter is kept unchanged to obtain a ratio between an increased preset numerator parameter and the preset denominator parameter as the second frequency-division parameter; or
   decreasing the preset denominator parameter when the preset numerator parameter is kept unchanged to obtain a ratio between the preset numerator parameter and a decreased preset denominator parameter as the second frequency-division parameter.

5. The method according to claim 1, wherein adjusting the preset first frequency-division parameter to obtain the second frequency-division parameter comprises:
   decreasing the first frequency-division parameter to obtain the second frequency-division parameter when the first quantity is less than a minimum boundary value of the default quantity range.

6. The method according to claim 5, wherein decreasing the first frequency-division parameter to obtain the second frequency-division parameter comprises:
   decreasing the first frequency-division parameter by a second preset threshold to obtain the second frequency-division parameter; or
   decreasing the first frequency-division parameter based on a second preset ratio to obtain the second frequency-division parameter.

7. The method according to claim 5, wherein the first frequency-division parameter is a ratio between a preset numerator parameter and a preset denominator parameter, and decreasing the first frequency-division parameter to obtain the second frequency-division parameter comprises:
   decreasing the preset numerator parameter when the preset denominator parameter is kept unchanged to obtain a ratio between a decreased preset numerator parameter and the preset denominator parameter as the second frequency-division parameter; or
   increasing the preset denominator parameter when the preset numerator parameter is kept unchanged to obtain a ratio between the preset numerator parameter and an increased preset denominator parameter as the second frequency-division parameter.

8. The method according to claim 1, wherein determining the second sampling frequency based on the second frequency-division parameter comprises:

performing frequency division processing on a generated oscillation signal to obtain a clock signal based on the second frequency-division parameter; and determining a frequency of the clock signal as the second sampling frequency.

9. The method according to claim 1, wherein the method further comprises:

continuing to detect an amount of the audio sampling points in the buffer area;

restoring the second frequency-division parameter as the first frequency-division parameter when a second quantity detected is within the default quantity range;

determining a third sampling frequency based on the first frequency-division parameter; and extracting the audio sampling points from the buffer area based on the third sampling frequency for playing audio.

10. An apparatus for playing audio data, comprising:

a processor; and a memory for storing instructions executable by the processor, wherein the processor is configured to:

detect an amount of audio sampling points in a buffer area that is configured to store the audio sampling points received from an electronic device based on a first sampling frequency, wherein the audio sampling points are obtained by decoding the audio data from the electronic device;

when a first quantity of the sampling points based on the first sampling frequency is out of a default quantity range, adjust a preset first frequency-division parameter to obtain a second frequency-division parameter;

determine a second sampling frequency based on the second frequency-division parameter; and extract the audio sampling points from the buffer area based on the second sampling frequency for playing the audio data.

11. The apparatus according to claim 10, wherein the processor is further configured to:

increase the first frequency-division parameter to obtain the second frequency-division parameter when the first quantity is greater than a maximum boundary value of the default quantity range.

12. The apparatus according to claim 11, wherein the processor is further configured to:

increase the first frequency-division parameter by a first preset threshold to obtain the second frequency-division parameter; or increase the first frequency-division parameter based on a first preset ratio to obtain the second frequency-division parameter.

13. The apparatus according to claim 11, wherein the first frequency-division parameter is a ratio between a preset numerator parameter and a preset denominator parameter, and the processor is further configured to:

increase the preset numerator parameter when the preset denominator parameter is kept unchanged to obtain a ratio between an increased preset numerator parameter and the preset denominator parameter as the second frequency-division parameter; or decrease the preset denominator parameter when the preset numerator parameter is kept unchanged to obtain a ratio between the preset numerator parameter and a decreased preset denominator parameter as the second frequency-division parameter.

14. The apparatus according to claim 10, wherein the processor is further configured to:

decrease the first frequency-division parameter to obtain the second frequency-division parameter when the first quantity is less than a minimum boundary value of the default quantity range.

15. The apparatus according to claim 14, wherein the processor is further configured to:

decrease the first frequency-division parameter by a second preset threshold to obtain the second frequency-division parameter; or decrease the first frequency-division parameter based on a second preset ratio to obtain the second frequency-division parameter.

16. The apparatus according to claim 14, wherein the first frequency-division parameter is a ratio between a preset numerator parameter and a preset denominator parameter, and the processor is further configured to:

decrease the preset numerator parameter when the preset denominator parameter is kept unchanged to obtain a ratio between a decreased preset numerator parameter and the preset denominator parameter as the second frequency-division parameter; or increase the preset denominator parameter when the preset numerator parameter is kept unchanged to obtain a ratio between the preset numerator parameter and an increased preset denominator parameter as the second frequency-division parameter.

17. The apparatus according to claim 10, wherein the processor is further configured to:

perform frequency division processing on a generated oscillation signal to obtain a clock signal based on the second frequency-division parameter; and determine a frequency of the clock signal as the second sampling frequency.

18. The apparatus according to claim 10, wherein the processor is further configured to:

continue to detect an amount of the audio sampling points in the buffer area;

restore the second frequency-division parameter as the first frequency-division parameter when a second quantity detected is within the default quantity range;

determine a third sampling frequency based on the first frequency-division parameter; and extract the audio sampling points from the buffer area based on the third sampling frequency for playing audio.

19. The apparatus according to claim 10, further comprising:

a signal generator;

a frequency divider; and a player, wherein the signal generator is configured to generate an oscillation signal, wherein the frequency divider is configured to perform frequency division processing on the oscillation signal to obtain a clock signal based on the second frequency-division parameter, and wherein the player is configured to determine a frequency of the clock signal as the second sampling frequency, and extract the audio sampling points from the buffer area based on the second sampling frequency for playing audio.

20. A non-transitory computer-readable storage medium storing instructions that, when executed by one or more processors of a device, cause the device to:

detect an amount of audio sampling points in a buffer area that is configured to store the audio sampling points received from an electronic device based on a first sampling frequency, wherein the audio sampling points are obtained by decoding the audio data from the electronic device;

when a first quantity of the sampling points based on the first sampling frequency is out of a default quantity range, adjust a preset first frequency-division parameter to obtain a second frequency-division parameter;

determine a second sampling frequency based on the second frequency-division parameter; and extract the audio sampling points from the buffer area based on the second sampling frequency for playing the audio data.

* * * * *